(12) United States Patent
Jentz et al.

(10) Patent No.: US 12,034,983 B2
(45) Date of Patent: Jul. 9, 2024

(54) CENTRALIZED MEDIATION BETWEEN AD-REPLACEMENT PLATFORMS

(71) Applicant: Roku, Inc., San Jose, CA (US)

(72) Inventors: Brian P. Jentz, Buxton (GB); Alejandro Gutierrez, Dallas, TX (US); Stefanos C. Liassides, Cardiff (GB)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/650,411

(22) Filed: Feb. 9, 2022

(65) Prior Publication Data

US 2022/0264163 A1 Aug. 18, 2022

Related U.S. Application Data

(60) Provisional application No. 63/200,092, filed on Feb. 12, 2021.

(51) Int. Cl.
| | | |
|---|---|---|
| *H04N 21/234* | (2011.01) | |
| *H04N 21/236* | (2011.01) | |
| *H04N 21/238* | (2011.01) | |
| *H04N 21/24* | (2011.01) | |
| *H04N 21/25* | (2011.01) | |
| *H04N 21/262* | (2011.01) | |
| *H04N 21/2668* | (2011.01) | |
| *H04N 21/433* | (2011.01) | |
| *H04N 21/442* | (2011.01) | |
| *H04N 21/458* | (2011.01) | |
| *H04N 21/81* | (2011.01) | |

(52) U.S. Cl.
CPC ..... *H04N 21/23424* (2013.01); *H04N 21/238* (2013.01); *H04N 21/4331* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 2002/0178447 A1* | 11/2002 | Plotnick | ........... | H04N 21/25435 348/E7.071 |
| 2014/0067538 A1* | 3/2014 | Hook | ................. | G06Q 30/0257 705/14.55 |

* cited by examiner

*Primary Examiner* — Brian T Pendleton
*Assistant Examiner* — Jean D Saint Cyr
(74) *Attorney, Agent, or Firm* — Sterne, Kessler, Goldstein & Fox P.L.L.C.

(57) ABSTRACT

A method and system for controlling dynamic ad replacement. An example method involves a computing system detecting that first and second ad-replacement platforms are or will be in contention with each other for replacement of a replaceable ad in a media stream and, responsive to at least the detecting, the computing system (i) deciding that the first ad-replacement platform should replace the replaceable ad and that the second ad-replacement platform should not replace the replaceable ad, and (ii) based on the deciding, causing the first ad-replacement platform to replace the replaceable ad and the second ad-replacement platform to not replace the replaceable ad.

15 Claims, 6 Drawing Sheets

CENTRALIZED MEDIATION BETWEEN AD-REPLACEMENT PLATFORMS

REFERENCE TO RELATED APPLICATIONS

This application claims priority to U.S. Provisional Patent Application No. 63/200,092, filed Feb. 12, 2021, the entirety of which is hereby incorporated by reference.

BACKGROUND

In a typical linear broadcast system, a producer or other provider of audio and/or video media content transmits a linear media stream representing the media content to one or more media distribution points, and each media distribution point in turn transmits the media stream to various end-user media clients for presentation. By way of example, a national television (TV) broadcaster in the United States may provide a digital television broadcast feed carrying a media stream to various multi-channel video program distributors (MVPDs), such as cable or satellite TV head-ends, that serve respective market areas throughout the country, and each MVPD may in turn transmit the media stream to various end-user devices, such as set top boxes, streaming media players (e.g., over-the-top (OTT) devices), audio/video receivers, and/or TVs, in the MVPD's market area for ultimate playout to end users.

The media stream of such a broadcast feed could include both program content and ad content. For instance, the media stream could include television programming with interspersed commercial breaks (i.e., ad pods), and each commercial break could include one or more ads. As the media stream gets distributed ultimately to end-user devices, the end-user devices could thus output for presentation both the program content and the interspersed ads.

SUMMARY

A dynamic ad replacement (or "dynamic ad insertion" (DAI)) system can operate to facilitate dynamic replacement of certain ads in such a media stream, so that when media stream is output for presentation, the media stream would include a replacement ad in place of an originally included ad. The system could thereby help tailor advertisements to a particular consumer or market, among other possibilities.

Such a system could be configured to carry out this dynamic ad replacement at an end-user device such as a TV or set top box within a user's home or other customer premises. For example, the end-user device could be programmed with an ad-replacement client module that interacts with various network servers to learn when a replaceable ad will be present in a media stream that the device is or will be processing for presentation and to determine a replacement ad that the device is to insert in place of that replaceable ad, and that causes the device to proceed accordingly, outputting the replacement ad in place of the replaceable ad as the device processes the media stream for presentation.

In an example implementation of this process, the end-user device could first receive advanced notice that the replaceable ad will be present at a particular upcoming time point in the media stream, and the device could then engage in advanced processing to prepare for replacing that ad at that upcoming time point. For instance, the device could receive from a network server a program schedule that specifies when various programs and ads are scheduled to occur in the media stream and that designates certain such ads as replaceable ads, thereby informing the device that a particular replaceable ad will occur at a particular upcoming time point in the media stream. Alternatively, the device could receive from a network server a control message specifically regarding a particular replaceable ad, informing the device that that particular replaceable ad will occur at particular upcoming time point in the media stream.

Provided with advanced notice of the upcoming replaceable ad in either of these or other ways, the device could then engage in signaling with a network server to determine what replacement ad to insert in place of the replaceable ad, and the device could obtain that replacement ad from local or network storage and could prepare to insert the replacement ad in place of the replaceable ad at the upcoming time point.

Further, the end-user device could engage in additional processing to ensure that replaceable ad is present in the media stream at its scheduled time, as a condition precedent for the device performing the ad replacement. For instance, the device could receive from a network server some unique information that would allow the device to detect actual presence of the replaceable ad in the media stream, and as the device then buffers or otherwise processes the media stream for presentation, the device could use that received information as a basis to determine if the replaceable ad is present in the media stream when expected, as a condition for the device proceeding with insertion of the replacement ad at that time.

By way of example, the device could receive from a network server a set of digital fingerprints representing starting video frames of the replaceable ad. The device could then generate its own digital fingerprints of frames of the media stream stating at the time point when the replaceable ad is supposed to be present, and the device could compare those digital fingerprints with the received digital fingerprints. The device could thereby conclude that the replaceable ad is present only if the device finds that the generated and received fingerprints match each other with sufficient certainty. Alternatively, the device could receive from a network server a unique identification code that would be watermarked in or otherwise included in the replaceable ad. The device could then search for and extract a watermarked code from the media stream at the time when the replaceable ad is supposed to be present. And the device could conclude that the replaceable ad is present only if the device finds such a watermarked code that matches the received identification code. Other examples could be possible as well.

If the device thereby detects that the replaceable ad is present in the media stream at the expected time, then the device can proceed to insert a replacement ad into the media stream at that time, so that the replacement ad would replace the replaceable ad in the media stream. Whereas, if the device detects that the replaceable ad is not present in the media stream at the expected time (e.g., if the device does not detect the replaceable ad in the media stream at the expected time), then the device could responsively abandon or otherwise forgo inserting the replacement ad into the media stream at that time. Further, the device may also report to a network server the results of this process, indicating whether or not the device successfully replaced the replaceable ad with the replacement ad, to facilitate accounting for the ad replacement.

While this or another such dynamic ad replacement system may work well as a general matter, one technical problem that can arise in practice is that two such systems may operate in conflict or contention with each other. This could happen, for instance, if the two systems operate sequentially on the same media stream as each other, such as sequentially in the same media-delivery path as each other, and where both systems would seek to replace the same replaceable ad as each other. In this situation, a first (upstream) system may successfully engage in dynamic replacement of the replaceable ad, but then a second (downstream) system would fail to engage in dynamic replacement of the replaceable ad since the first system would have already replaced ad with a replacement ad.

By way of example, consider a scenario where a linear media stream en route to be presented at customer premises passes sequentially through at least two end-user devices at the customer premises, and where each device has a respective ad-replacement platform (e.g., a respective ad-replacement client) that would operate on that media stream. For instance, the media stream may pass through a cable-TV set top box (STB) or OTT media player that has a first ad-replacement platform and may then (immediately or through one or more other intervening devices) to a TV that has a second ad-replacement platform.

In that scenario, the linear media stream may include a particular replaceable ad (e.g., within an ad pod), and both of these ad-replacement platforms may engage in processing to prepare for and attempt to replace that particular ad. As discussed above, for instance, each ad-replacement platform may receive advanced notice that the replaceable ad will be present in the media stream at a particular upcoming time point, and each ad-replacement platform may therefore obtain a replacement ad to be inserted in place of the replaceable ad at that time point. Further, as discussed above, each ad-replacement platform may engage in processing to confirm that the replaceable ad is actually present in the media stream at the expected time, as a condition precedent for proceeding with the ad replacement.

Unfortunately, however, while this ad-replacement process may work well at the first (upstream) ad-replacement platform in this sequence, the ad-replacement process would fail at the second (downstream) ad-replacement platform in the sequence, because the second ad-replacement platform would not detect the actual presence of the replaceable ad in the media stream since the first ad-replacement platform would have replaced it by the time that portion of the media stream reaches the second ad-replacement platform. This failure, and indeed the overall scenario where two sequential ad-replacement platforms seek to replace the same ad spot as each other, is inefficient and undesirable.

The present disclosure provides a technical advance that may help to address this problem. In accordance with the disclosure, a central computing system will detect a scenario where two ad-replacement platforms would be in contention with each other for replacement of a given replaceable ad, and the computing system will responsively take action to control which one of the platforms will replace that ad, and optimally to help minimize or eliminate work that each other platform of the multiple platforms would take related to replacement of that ad. For instance, the computing system could detect a scenario where two ad-replacement platforms are both in operation at the same household as each other and, perhaps more specifically, that the two ad-replacement platforms are in the same media-delivery path as each other (e.g., in the same path along which media would flow for presentation at a given TV). Faced with this scenario, the computing system could then take action to cause one of the platforms to replace the ad and to cause the other platform to forgo engaging in processing that would be involved in attempting to replace the ad.

The central computing system could engage in direct or indirect network communication respectively with each ad-replacement platform and could carry out its control process in a push or pull configuration. For instance the computing system could detect an upcoming scenario where the multiple platforms would be contending for the same ad-replacement opportunity as each other, and, in response, the computing system could proactively signal to one or both of the platforms and/or other associated entities to instruct and thus control which platform will handle that ad-replacement instance. Or the computing system could receive a query respectively from each platform as the platform learns of the given ad-replacement opportunity, and the computing system could respond by instructing and thus causing just one of the platforms to handle that ad replacement.

By way of example, the central computing system could include or have access to data indicating (e.g., probabilistically) that a given customer premises has an upstream STB with a first ad-replacement platform and a downstream TV with a second ad-replacement platform, and the computing system may receive information or otherwise learn that the downstream TV is currently presenting a particular channel. Further, based on a program schedule provided in advance by a publisher or other provider of that channel, the computing system may learn of an upcoming replaceable ad on that channel. Given that both platforms are candidates to replace that particular ad, the computing system may determine that the platforms are in contention with each other for replacement of the ad. Therefore, the computing system may proactively select one of the two platforms to be the one that will replace the ad. And the computing system may engage in signaling with each platform or with one or more associated servers, to cause just the selected platform to replace the ad and to cause the other platform to forgo from work to replace the ad.

As another example, the computing system may include or have access to data indicating (e.g., probabilistically) that a given customer premises has an upstream OTT media player with a first ad-replacement platform and a downstream TV with a second ad-replacement platform. While the OTT media player is processing a given streaming media channel for output to and presentation by the TV, each of these ad-replacement platforms or one or more servers associated respectively with each ad-replacement platform may determine based on respective signaling or schedule data that that channel includes a given replaceable ad at an upcoming time point, and each platform or an associated server may then responsively send a respective query to the computing system, asking whether or not the platform should replace that ad. Based on the data indicating that these two ad-replacement platforms operate sequentially in the same media-delivery path as each other, the computing system may determine in response to these queries that the platforms are in contention with each other for replacement of the ad. Therefore the platform may select one of the two platforms and respond to the queries in a manner that causes just the selected platform to replace the ad and causes the other platform to forgo from work to replace the ad.

In this process, the computing system could take into account various factors as a basis to decide dynamically which ad-replacement platform should replace a given ad and which ad-replacement platform should refrain from doing so. For instance, the computing system could take into creative-separation and frequency-capping policies and/or other business policies. Further, the computing system could take into account historical ad-replacement-success rate respectively of each platform, which might inherently account for such policies, among other possibilities.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

The present disclosure will focus on an example implementation where two end-user devices at a household or other customer premises could be in contention with each other for dynamic ad replacement. In particular, the disclosure will focus on an example implementation where the customer premises includes a media receiver and a media presentation device that operate in sequence to process a media stream for presentation by the media presentation device, and where each of these devices includes a respective ad-replacement platform so that the devices may both attempt to replace the same ad instance as each other in a given media stream.

It will be understood, however, that the disclosed principles could extend to apply in other contexts as well. For instance, the ad-replacement platforms could be provided in other devices, the media-delivery path could take other forms, and the ad-replacement platforms could be located at other places in the media-delivery path, within or outside the customer premises. Further, there could be more than two such ad-replacement platforms in contention with each other. Other examples could be possible as well.

More generally, it will be understood that arrangements and processes described herein can take various other forms. For instance, elements and operations can be re-ordered, distributed, replicated, combined, omitted, added, or otherwise modified. Further, it will be understood that functions described herein as being carried out by one or more entities could be implemented by and/or on behalf of those entities, through hardware, firmware, and/or software, such as by one or more processing units executing program instructions or the like.

Figure 1:
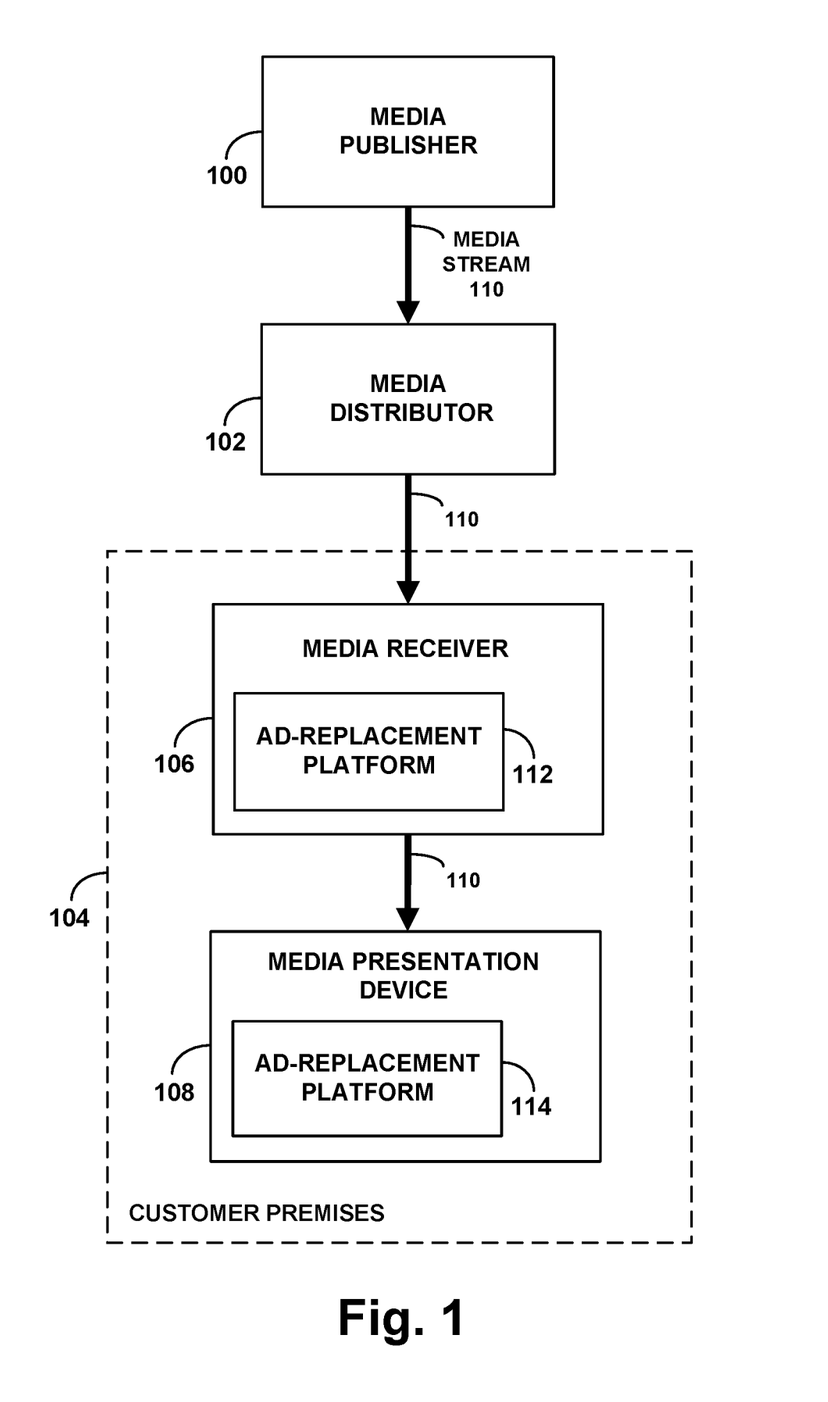
FIG. 1 is a simplified block diagram of an example system in which various disclosed principles can be applied.

Referring to the drawings, FIG. 1 illustrates an example system in which disclosed features could be implemented. As shown in FIG. 1, the example system includes a media publisher 100, a media distributor 102, and customer premises 104 including a media receiver 106 and a media presentation device 108. This system thus provides an example media-delivery path through which a representative media stream may be delivered for ultimate presentation by the media presentation device 108.

Each of these illustrated components could take various forms. Without limitation, for instance, the media publisher 100 could be a national TV broadcaster, an OTT-channel provider, or a gaming service provider, among other possibilities, the media distributor 102 could be an MVPD (e.g., a cable or satellite head end, or a virtual MVPD such as an OTT-device provider), or a gaming distributor, among other possibilities, the media receiver 106 could be a STB, an OTT media player, personal computer, or a gaming device, among other possibilities, and the media presentation device 108 could be a TV, a computer display, or a projection system, among other possibilities.

With this or other arrangements, the media publisher 100 could deliver a media stream 110 to the media distributor 102 for distribution to various end-users. And the media distributor 102 could distribute the media stream 110 to the media receiver 106 as a particular channel of content (e.g., on a particular frequency, as a particular streaming media session, and/or as another defined channel). As the media receiver 106 receives this media stream 110, the media receiver 106 could then process the media stream 110 for presentation. For instance, the media receiver 106 may receive the media stream 110 encapsulated in a packet-based transport stream from the media distributor 102, and the media receiver 106 may extract the media stream 110 from that transport stream and output the extracted media stream 110 through a High Definition Media Interface (HDMI) or other connection that feeds directly or indirectly to the media presentation device 108. And as the media stream 110 flows from the media receiver 106 to the media presentation device 108, the media presentation device 108 may then further process the media stream 110 for presentation. If the media stream 110 includes both video and audio, for instance, the media presentation device 108 may render content of the media stream 110 for presentation on a display screen and sound system to a user.

As shown further in FIG. 1, the media receiver 106 and media presentation device 108 each have a respective ad-replacement platform, such as an ad-replacement client configured to work with cloud-based servers for instance. Namely, the media receiver 106 includes a first ad-replacement platform 112, and the media presentation device includes a second ad-replacement platform 114. Given the direction of media flow, the ad-replacement platform 112 of the media receiver 106 is thus an upstream ad-replacement platform, and the ad-replacement platform 114 of the media presentation device 108 is a downstream ad-replacement platform.

In example operation, each of these ad-replacement platforms may interoperate with one or more respective network servers that enable the platform to perform dynamic ad replacement with respect to ads in the media stream 110. For instance, the media receiver 106 and media presentation device 108 may each be manufactured or otherwise provided by respective equipment provider, and each equipment provider may operate or arrange for operation of a network-based ad-replacement service and may configure its device with a respective media client arranged to interoperate with one or more servers of that network-based ad-replacement service. Further, the structure and operation of one such ad-replacement system may differ from the structure and operation of another such ad-replacement system.

Figure 2:
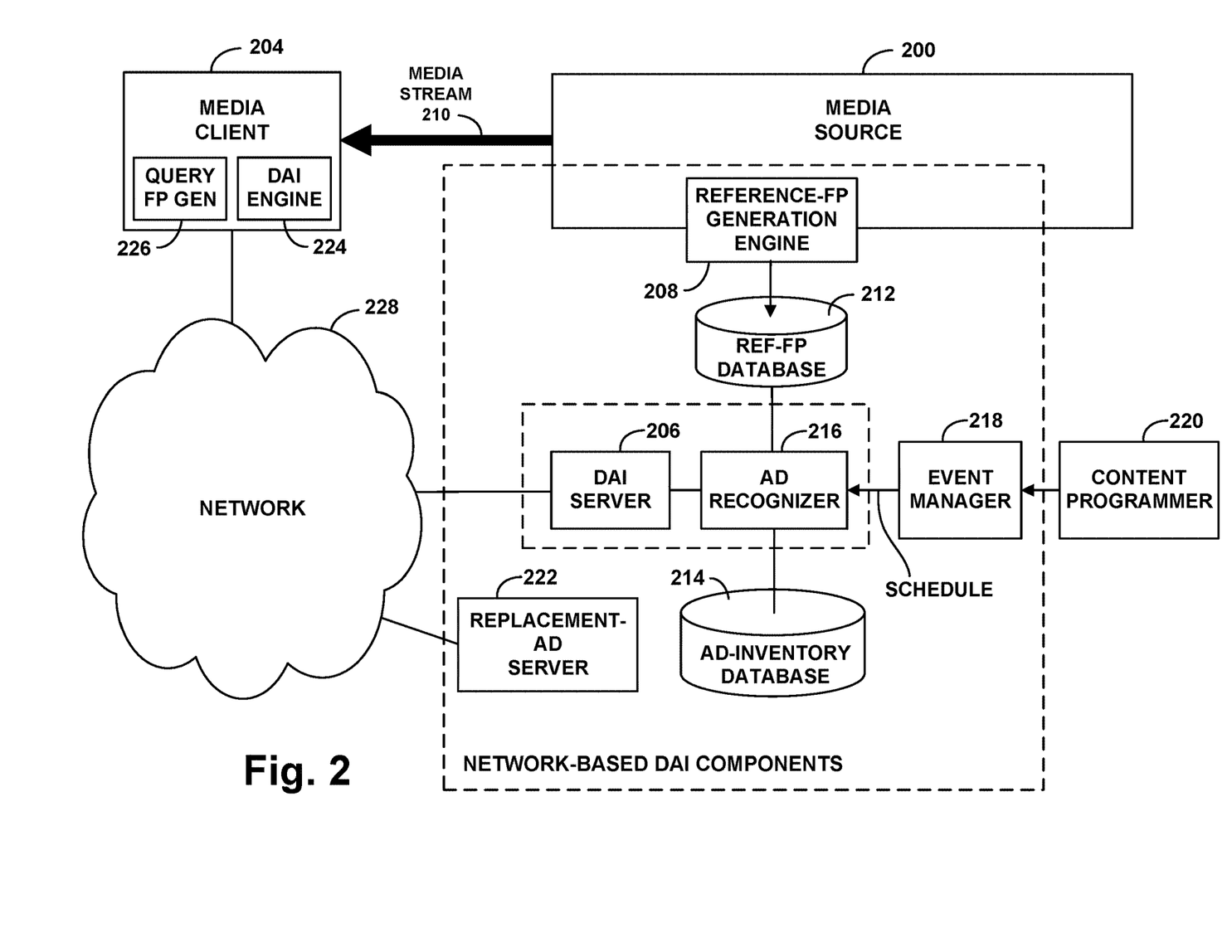
FIG. 2 is another simplified block diagram of an example system in which various disclosed principles can be applied.

FIG. 2 is a simplified block diagram of a system that could implement dynamic ad replacement, to help explain how dynamic ad replacement could work in a non-limiting example with respect to each of the ad-replacement platforms shown in FIG. 1.

The system of FIG. 2 includes a representative media-delivery path similar to that shown in FIG. 1, with an example media source 200 and an example media client device 204. Here, the media source 200 could represent the media publisher 100 and/or media distributor 102 of FIG. 1, and the media client 204 could represent either the media receiver 106 or the media presentation device 108 of FIG. 1. With this arrangement, as in FIG. 1, a representative media stream 210 could thus flow from the media source 200 to the media client 204, and the media client 204 could process the media stream 210 for presentation. For instance, the media client could decapsulate, transcode, forward, store, and/or otherwise process the media stream 210 for presentation itself or for output and ultimate presentation by another device (not shown) in the media-delivery path.

Media stream 210 could be a linear media stream, such as a broadcast feed and/or a streaming media channel, among other possibilities. In an example implementation, the media content of this media stream 210 could define a sequence of digital frames of media content (e.g., video frames, each being a respective image or the like) that the media client 204 could process to facilitate presentation to users. As noted above, for instance, the media source 200 and/or another entity might broadcast, stream, or otherwise provide such a sequence of frames encapsulated in a transport stream, and the media client 204 may receive that transport stream and extract the underlying linear media stream or may receive the media stream that an upstream device already extracted from the transport stream if applicable.

As noted above, media stream 210 could contain both program content and ad content. For instance, the media stream 210 could carry television programming, movies, games, or other media content with interspersed commercial breaks including ads. Further, as noted above, it may be useful to implement DAI with respect to this media stream 210, to dynamically replace particular ads with replacement ads, possibly targeted to specific markets and/or end-users.

FIG. 2 further illustrates components specific to an example DAI system, which could operate to facilitate dynamic ad replacement.

As shown, without limitation, the example DAI system could include a DAI server 206, which could coordinate dynamic ad replacement. Further, the DAI system could include, perhaps at the media source 200, a reference-fingerprint-generation engine 208, which could generate and provide digital reference fingerprints representing media streams that are being distributed to media clients, such as media stream 210 being delivered to media client 204. And the DAI system could include a reference-fingerprint database 212, which could store the generated reference fingerprints.

In addition, the DAI system could include an ad-inventory database 214, which could store digital fingerprints representing ads that are subject to dynamic replacement. And the DAI system could include an ad recognizer 216, which could operate to compare reference fingerprints with ad fingerprints so as to detect the presence of replaceable ads in media streams being distributed. Further, the DAI system could include an event manager 218 which could operate to receive schedule data from a content programmer 220 and to provide to the ad recognizer 216 at least scheduled timing information as to the presence of upcoming ads in the media streams. And the DAI system could include a replacement-ad server 222, which could serve replacement ads for insertion in place of replaceable ads.

In an example implementation, the DAI system could also include at media client 204 various program modules, including a DAI engine 224 configured to carry out dynamic ad replacement as discussed above and a query-fingerprint-generation engine 226 configured to generate digital query fingerprints of the media stream 210 that the media client 204 is processing for presentation.

As further shown in FIG. 2, media client 204 is interconnected with a network 228, such as the Internet, that provides connectivity with various server-side components such as the DAI server 206 and the replacement-ad server 222. For instance, the media client 204 could sit as a node on a local area network (LAN), with the media client 204 having an assigned Internet Protocol (IP) address on the LAN and the LAN having an public IP address on network 228. And the various server-side components could be accessible at predefined IP addresses on network 228. Thus, media client 204 could engage in data communication with various server-side components via the network 228 while the media client 204 is processing media stream 210 for presentation.

The example arrangement of FIG. 2 may implement client-side dynamic ad replacement, using schedule data as a basis to provide the media client 204 with advanced notice of a replaceable ad that is scheduled at an upcoming time point in the media stream 210, and using fingerprint matching as a basis to detect presence of the replaceable ad in the media stream 210 and to trigger dynamically replacing that ad with a replacement ad.

To facilitate dynamic ad replacement, the example DAI system could regularly populate reference-fingerprint database 212 with reference fingerprint data. For instance, as media stream 210 is being provided by media source 200, the reference-fingerprint-generation engine 208 could programmatically generate digital reference fingerprints on a per-frame basis or other ongoing basis and could establish for each such reference fingerprint associated metadata including for instance an identity of the media stream and a reference timestamp indicating a time point of the associated frame in the media stream. And the reference-fingerprint-generation engine 208 could provide these reference fingerprints and associated metadata for storage in the reference-fingerprint database 212 in a manner that allows ready searching and access.

An example digital fingerprinting process as to video content could involve establishing a unique representation of luminosity and/or other video characteristics per video frame. For instance, for each video frame, the reference-fingerprint-generation engine 208 could programmatically divide the frame into a grid, measure luminosity per grid cell, and generate as a digital reference fingerprint of the frame a bit string in which each bit or series of bits represents luminosity of a respective grid cell or represents a weighted difference between the luminosity of certain defined pairs of the grid cells, among other possibilities. Further, the reference-fingerprint-generation engine 208 could apply this process continually as to each frame, as to each key frame, periodically, or on another defined basis. Other digital fingerprinting processes could be used as well.

In addition, to facilitate dynamic ad replacement, the ad indexer 216 could populate the ad-inventory database 214 with digital fingerprints representing replaceable ads, i.e., ads that could be subject to dynamic replacement. For instance, the ad indexer 216 could receive copies of the ads, perhaps as MP4 video files, a fingerprint-generation engine could generate digital ad fingerprints representing frames of those video files, and the ad indexer 216 could store the generated ad fingerprints in the ad-inventory database 212. For example, the ad indexer 216 could receive these ad video files from ad programmers, along with associated metadata such as ad identification, duration, and description information. And for each such received ad video file, the ad indexer 216 could then work with fingerprint-generation engine 208 or another fingerprint-generation engine, to generate digital ad fingerprints representing the sequence of video frames of the ad, and the ad indexer 216 could store each ad's generated sequence of ad fingerprints in the ad-inventory database 214 along with the associated metadata, in a manner that allows ready searching and access.

To carry out client-side DAI, the DAI engine 224 at media client 204 could interwork with the DAI server 206 and/or one or more other network entities. Through this interaction, for instance, the DAI server 206 may learn the identity of the media stream 210 that the media client 210 is processing for presentation. Further, the DAI server 206 may provide the media client 204 with advanced notice of a replaceable ad that is scheduled to be present in the media stream 210 at an upcoming time point so that the media client 204 could prepare for replacement of that ad. And the DAI server 206 may provide the media client 204 with fingerprints representing at least starting frames of the replaceable ad so that the media client 204 can perform client-side fingerprint matching to confirm actual presence of that ad in the media stream 210 as a condition for the media client 204 then inserting a replacement ad in its place.

The DAI server 206 could learn in various ways the identity of the media stream 210 that the media client 204 is processing for presentation. By way of example, if the media client 204 has knowledge of the identity of the media stream 210, then the media client 204 could transmit an indication of that identity to the DAI server 206. Alternatively, if the media client 204 does not have knowledge of the identity of the media stream 210, then the DAI server 206 could engage in fingerprint-based processing to identify the media stream 210. For instance, as the media client 204 processes the media stream 210 for presentation, the query-fingerprint-generation engine 222 could regularly generate digital query fingerprints representing frames of the media stream 210 and could regularly transmit the generated query fingerprints to the DAI server 206 for analysis. And the DAI server 206 could compare those query fingerprints with reference fingerprints in the reference-fingerprint database 212 to find a match, which would indicate that the media stream represented by the matching reference fingerprints is the media stream 210 being processed by the media client 204 for presentation. In addition, the DAI server 206 could inform the media client 204 of the identity of the media stream 210 that the media client 204 is processing for presentation.

Further, the DAI server 206 could provide the media client 204 with advanced notice of an upcoming replaceable ad instance in various ways.

For instance, the DAI server 206 could receive the above-noted schedule data and could forward the schedule data to the media client 204. This schedule data could take the form of an extensible markup language (XML) document and could specify on a per media stream basis the scheduled times of upcoming ads and, for each ad, whether the ad is replaceable, a duration of the ad, and a subject matter of the ad, among other information. The DAI server 206 could receive and send such schedule data to the media client 204 on a daily basis, which could inform the media client 204 of ads scheduled respectively on various media streams including media stream 210. Or upon identifying the media stream 210 that the media client 204 is processing, the DAI server 206 could send to the media client 204 the ad schedule data specifically for that media stream 210. Based on this schedule data, the media client could thus determine that a given ad is scheduled to be present on media stream 210 at a particular upcoming time, and that that ad is a replaceable ad.

Alternatively, the DAI server 206 could learn about a specific upcoming replaceable ad in the media stream 210, and the DAI server 206 could signal to the media client 204 informing the media client 204 of the time when that specific replaceable ad is expected to be present in the media stream 210. For instance, the DAI server 206 could learn about this upcoming replaceable ad from schedule data as noted above or in another manner, and, given knowledge that the media client is processing the media stream 210 for presentation, the DAI server 206 could transmit to the media client 204 a control signal providing the media client 204 with the scheduled time of the replaceable ad and with other information as noted above.

In any of these or other ways, the media client 204 could learn well in advance of the scheduled time of the upcoming replaceable ad that the replaceable ad is upcoming in the media stream 210. For instance, the media client 204 could learn at least five minute before the scheduled time of the replaceable ad that the replaceable ad will appear in the media stream 210. The media client 204 could then responsively engage in processing to prepare itself to replace the replaceable ad.

For instance, the media client 204 could responsively engage in signaling with the replacement-ad server 222, requesting a replacement ad that media client 204 can insert in the media stream 210 in place of the replaceable ad. In this signaling, the media client 204 could provide the replacement-ad server 222 with information about the replaceable ad, such as its identity, duration, and subject matter. And the replacement-ad server 222 could responsively provide the media client 204 with a replacement ad (e.g., a video file of the replacement ad). Or the replacement-ad server 222 could responsively provide the media client 204 with a uniform resource locator (URL) or other information identifying a replacement ad for the media client 204 to obtain and indicating a location from which the media client 204 could obtain that replacement ad; and the media client 204 could then obtain the replacement ad as indicated. Further, upon receipt of the replacement ad, the media client 204 may buffer or otherwise process the replacement ad, in preparation for inserting the replacement ad in place of the replaceable at the scheduled upcoming time point in the media stream 210.

In addition, as noted above, the DAI server 206 could provide the media client 204 with fingerprints representing at least starting frames of the replaceable ad so that the media client 204 can perform client-side fingerprint matching to confirm actual presence of that ad in the media stream 210 as a condition for the media client 204 then inserting a replacement ad in its place.

For instance, given the replaceable ad identity, the DAI sever 206 could obtain from the ad-inventory database 214 a set of digital fingerprints of the replaceable ad and could transmit those ad-fingerprints to the media client 204. Alternatively, if there is a transmission delay of media stream 210 for transmission from the media source 200 to the media client 204, the DAI server 204 could leverage that delay by obtaining from the reference-fingerprint database 212 a set of reference fingerprints representing frames of the media stream 210 leading up to and at least partially into the replaceable ad and could transmit those reference fingerprints to the media client 204 through network 228.

Further, the fingerprint generator 226 at the media client 204 could generate digital query fingerprints of the media stream 210 being processed, and the media client 204 could compare those generated query fingerprints with the fingerprints provided by the DAI server, to determine whether the replaceable ad is actually present at the scheduled time in the media stream 210 that the media client 204 is processing. And if the media client 204 finds that the query fingerprints representing frames of the media stream 210 starting at the scheduled time match the provided fingerprints for corresponding frames, then the media client 204 could conclude that the replaceable ad is present in the media stream at the scheduled time, and the media client 204 could proceed to insert the replacement ad in its place at that time. Whereas, if the media client 204 finds that the query fingerprints starting at that scheduled time do not match the provided fingerprints, then the media client 204 could conclude that the replaceable ad is not present in the media stream at the scheduled time, and the media client 204 could responsively forgo inserting the replacement ad at that time and thus abandon the ad replacement process.

In an example implementation as noted above, the media client 204 could also report to a network server the result of its ad-replacement process. For instance, the media client 204 could report to the DAI server 206 or to another server, indicating whether or not the media client 204 successfully replaced the replaceable ad and providing other associated information, such as an identity of the replacement ad if successful, among other information. The DAI server 206 or other server could thus compile statistics over time indicating the media client's ad-replacement success rate and may also use the reporting as a basis to facilitate accounting and other operations related to ad replacement.

Referring now back to FIG. 1, in the example scenario as noted above, the media receiver 106 and the media presentation device 108 are each configured with a respective ad-replacement platform. Each such ad-replacement platform could comprise a respective client-side DAI engine such as DAI engine 224 shown in FIG. 2, which may interwork with respective network-based DAI components like those shown in FIG. 2.

A problem with this arrangement, as noted above, is that these ad-replacement platforms operate in the same media-delivery path as each other and may therefore attempt to replace the same replaceable ad instance as each other. Both ad-replacement platforms may engage in processing including various signaling and other processing as indicated above to prepare for replacement of that replaceable ad, but only the upstream ad-replacement platform 112 (in the media receiver 106) may succeed. The downstream ad-replacement platform 114 (in the media presentation device 108) will likely fail, since the upstream ad-replacement platform 112 would have replaced the replaceable ad with a replacement ad already by the time the media stream reaches the downstream ad-replacement platform 114. As noted above, this result is inefficient and undesirable.

As indicated above, the present disclosure provides a mechanism to help address this problem. In accordance with the disclosure, a computing system could determine that two (or more) such ad-replacement platforms are in contention with each other for replacement of a given replaceable ad, and the computing system could then responsively select one of the ad-replacement platforms to replace the replaceable ad and engage in signaling to cause the selected ad-replacement platform to replace the replaceable ad and to cause the other ad-replacement platform to forego from work to replace the replaceable ad.

Figure 3:
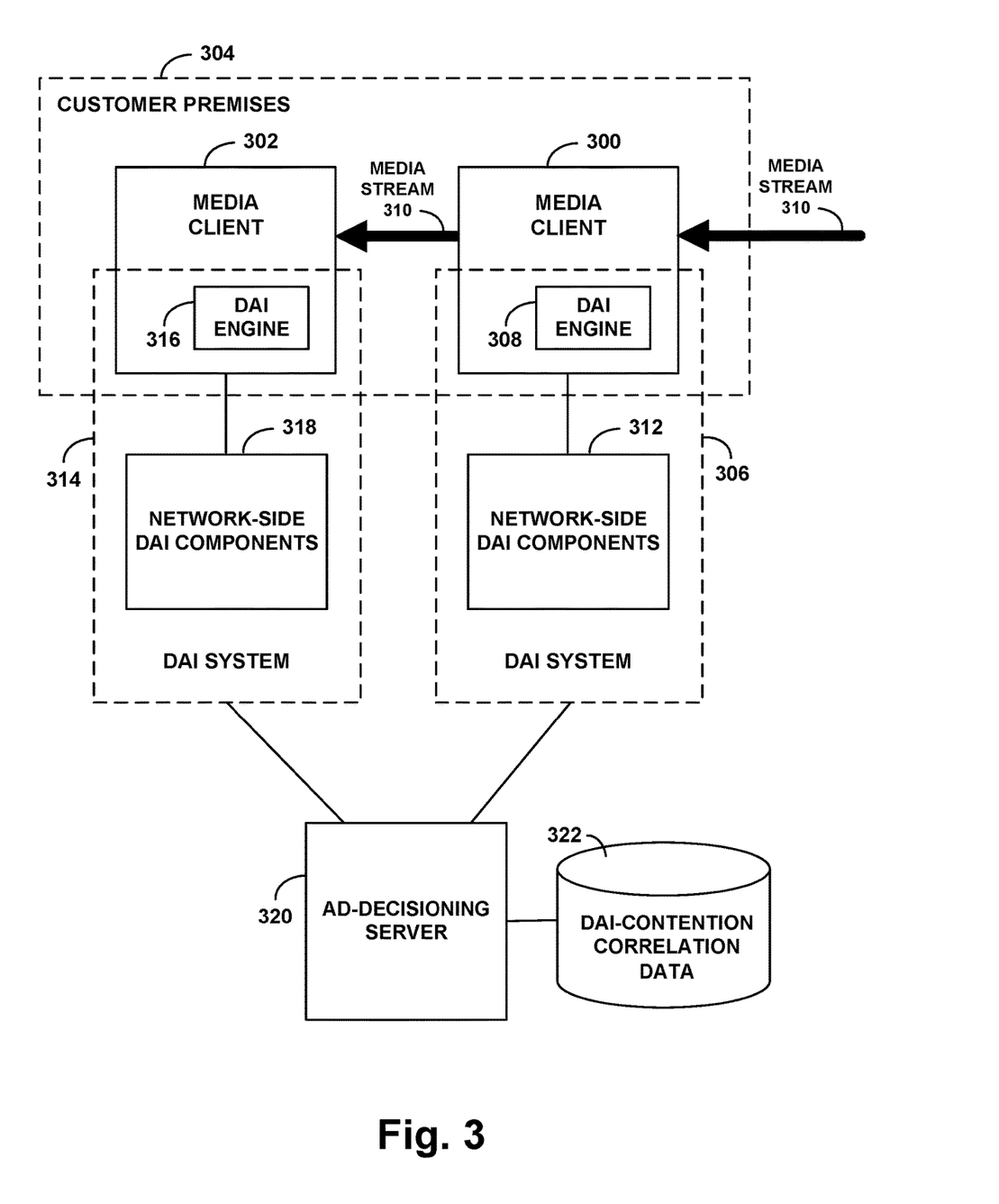
FIG. 3 is another simplified block diagram of an example system in which various disclosed principles can be applied.

FIG. 3 is a simplified block diagram of a network arrangement implementing such a computing system as an enhancement of the arrangements shown in FIGS. 1 and 2. FIG. 3 depicts two media clients 300, 302 positioned in common customer premises 304 and positioned sequentially in a common media delivery path along which a media stream 310 flows, so that the media stream 310 first passes through media client 300 and thereafter passes to or through media client 302. In an example implementation, media client 300 could be a media receiver as in FIG. 1, and media client 302 could be a media presentation device as in FIG. 1, and the customer premises 304 could be a common household or other location.

As further shown, each of these media clients has an associated DAI system that includes a client-side DAI engine and network-side DAI components perhaps like those shown in FIG. 2. In particular, media client 300 has an associated DAI system 306 that includes a client-side DAI engine 308 with associated and network-side DAI components 312. And media client 302 has an associated DAI system 314 that includes a client-side DAI engine 316 and associated and network-side DAI components 318. Although the media clients are shown with separate network-side DAI components, in an alternative implementation the media clients could have a common set of network-side DAI components.

With this example arrangement, media clients 300, 302 (i.e., their associated DAI engines 306, 314) could be contention with each other for dynamic replacement of a given replaceable ad in media stream 310, since the media clients 300, 302 are each configured to engage in dynamic ad replacement and the media clients 300, 302 are positioned sequentially in a common media-delivery path along which media stream 310 flows. In particular, applying procedures like those discussed above, both media clients may learn that the replaceable ad is scheduled to be present in the media stream 310 at a particular upcoming time point, and both media clients 300, 302 may therefore engage in advanced processing to prepare for replacement of that replaceable ad. However, as discussed above, while the upstream media client 300 may then successfully replace the ad, the downstream media client 302 may fail to do so, as media client 300 would have already replaced the replaceable ad with a replacement ad by the time that portion of the media stream 310 reaches media client 302.

In this example arrangement, both of the media clients' associated DAI systems 306, 314 are in communication with an ad-decisioning server 320, which could operate as an example computing system to mediate between the DAI systems, to help avoid or overcome a DAI contention problem. This ad-decisioning server 320 could be accessible over a broadband network such as the Internet, so that components of the DAI systems 306, 314 could engage in network communication with the ad-decisioning server 320. For instance, the client-side DAI engines 308, 316 of each DAI system might engage in network communication with the ad-decisioning server 320, and/or various network-side DAI components 312, 318 of each DAI system might engage in network communication with the ad-decisioning server.

Ad-decisioning server 320 could engage in signaling communication with both DAI systems 306, 314 in order to control which of the media clients 300, 302 will handle dynamic replacement of a given replaceable ad in media stream 310.

For instance, as each media client's DAI system learns that the replaceable ad is scheduled to be present in the media stream 310, the DAI system could transmit a query to the ad-decisioning server 320 to determine if the DAI system should replace that ad, the ad-decisioning server 320 could respond to the DAI system with an decision of whether or not the DAI system should replace the ad, and the DAI system could operate according to that decision. If the ad-decisioning server 320 responds that the DAI system should replace the ad, then the DAI system could proceed with an effort to replace the ad. Whereas, if the ad-decisioning server responds that the DAI system should not replace the ad, then the DAI system could forgo engaging in that effort.

By way of example, if and when a media client's DAI engine receives a schedule or other advanced notice that the replaceable ad is scheduled to be present in media steam 310 at an upcoming time point, the media client may signal to the ad-decisioning server 320 to ask the ad-decisioning server if the media client should replace that replaceable ad, the ad-decisioning server may respond with a decision of whether or not the media client should do so, and the media client may operate accordingly.

As another example, if and when a DAI server, replacement-ad server, or other network-based entity in a media client's DAI system receives a schedule or other advanced notice that the replaceable ad is scheduled to be present in the media stream 310 at an upcoming time point, that entity may signal to the ad-decisioning server 320 to ask if the media client should replace that replaceable ad, the ad-decisioning server may respond with a decision of whether or not the media client should do so, and the entity may take action to carry out that decision. For instance, if the decision is that the media client should replace that replaceable ad, then the entity could engage in signaling with the media client to enable or cause that to happen as discussed above. Or if the decision is that the media client should not replace that replaceable ad, the entity could forgo engaging in such signaling with the media client.

As a more specific implementation of this last example, for instance, when the media client's DAI server receives schedule data that indicates that the replaceable ad is scheduled to be present in the media stream 310 at an upcoming time point and, the DAI server may interact with the ad-decisioning server 320 to determine whether the media client should work to replace that ad. And based on that interaction, the DAI server may then either forward the scheduling data as is to the media client, which may cause the media client to prepare for and carry out replacement of that replaceable ad as discussed above, or revise the scheduling data such as to remove the indication that that ad is a replaceable ad and then forward the revised scheduling data to the media client, which may result in the media client not working to replace that ad.

As another more specific implementation of the last example, when a media client's replacement-ad server receives from the media client a request for a replacement ad for the media client to insert in the media stream 310 in place of the replaceable ad, the replacement-ad server may interact with the ad-decisioning server 320 to determine whether the media client should work to replace that ad. And based on that interaction, replacement-ad server may respond accordingly to the media client. For instance, if the ad-decisioning server 320 indicates that that the media client should replace the replaceable ad, then the replacement-ad server may respond to the media client with an indication of a replacement ad that the media client should insert in place of the replaceable ad as discussed above, and the media client may proceed to do so. Whereas, if the ad-decisioning server 320 indicates that the media client should not replace the replaceable ad, then the replacement-ad server may respond to the media client with a directive for the media client to not replace the replaceable ad, and the media client may therefore forgo further work to replace the replaceable ad.

Alternatively, without being queried by a DAI system, the ad-decisioning server 320 could push to the DAI system an advanced indication of whether a given media client should plan to replace the replaceable ad. For instance, the ad-decisioning server 320 could be provisioned with data that indicates that the given media client is DAI capable, the ad-decisioning server 320 could decide in advance whether that media client should replace the replaceable ad and could autonomously transmit to the media client's DAI system a message that causes the media client to operate in accordance with the decision.

By way of example, if the ad-decisioning server 320 has access to scheduling data for media streams that the media client could potentially process for presentation, the ad-decisioning server 320 could decide whether or not the media client should replace a particular ad and could revise that scheduling data to indicate accordingly whether or not that ad is a replaceable ad, and the ad-decisioning server 320 could then transmit that scheduling data to the media client or to a DAI server or other entity for forwarding to the media client. Based on this scheduling data, the media client could then operate in accordance with the ad-decisioning server 320's decision. Namely, if the ad-decisioning server 320 had decided and indicated in the scheduling data that the media client should replace the ad, then the media client could proceed as discussed above to prepare for and carry out replacement of the ad. Whereas, if the ad-decisioning server 320 had decided and indicated in the scheduling data that the media client should not replace the ad, then the media client would not engage in processing to do so.

To facilitate mediating between two ad-replacement platforms to help avoid or overcome a DAI contention issue, the ad-decisioning server 320 in a representative implementation could include or have access to DAI-contention correlation data 322. This correlation data 322 could uniquely identify each of various ad-replacement platforms, or their associated devices, that are DAI capable (i.e., capable of engaging in dynamic ad replacement). And the correlation data 322 could correlates pairs of such devices or ad-replacement platforms as being likely to experience DAI contention with each other. In the arrangement of FIG. 3, for instance, the correlation data 322 could correlates media client 300 and media client 302 (or their respective DAI engines 306, 314) with each other as likely to experience DAI contention with each other.

This DAI-contention correlation data 322 could be established in various ways. By way of example, the data could be manually pre-provisioned, such as by user entry of data uniquely identifying each of various ad-replacement platforms or devices that is DAI capable and entry of data specifying pairings or other correlations of those devices as being devices in the same media delivery path as each other. Alternatively, the ad-decisioning server 320 and/or one or more other entities could dynamically establish the correlation data 322 based on experience over time.

As one example implementation, the ad-decisioning server 320 could populate the correlation data 322 based at least in part on signaling that the ad-decisioning server 320 receives from various media clients over time and based on other interaction that the ad-decisioning server has with the media clients over time.

For instance, based on IP communication that media clients have with the ad-decisioning sever 320 (e.g., sending queries asking whether to replace a given replaceable ad), the ad-decisioning server could determine and record in the correlation data 322 each media client's unique device identifier and also each media client's public IP address. If and when the ad-decisioning server 320 so records the same public IP address for two different media clients, the correlation data 322 could thereby indicate that those two media clients are at the same customer premises as each other, and the ad-decisioning server 320 may also expressly record that fact as part of the correlation data 322 as an indication that the media clients are likely to be in DAI contention with each other. Further, if and when the ad-decisioning server 320 also receives requests from both of those media clients for permission replace the same replaceable ad instance as each other, the ad-decisioning server 320 may also record that fact as part of the correlation data 322 as further factor, increasing likelihood that the two media clients would be in DAI contention with each other.

Still further, a media client may expressly inform the ad-decisioning that the media client is connected directly or directly with another media client. For instance, if two media clients are connected with each other over an interface that enables one of the media clients to determine the identity of the other media client, such over an HDMI interface with a Consumer Electronics Control (CEC) feature for instance, one of the media clients may report to the ad-decisioning server 320 that the two media clients are connected with each other. And the ad-decisioning server 320 may record that fact in the correlation data 322 as an another factor, additionally increasing the likelihood that the two media client may be in DAI contention with each other.

In an example implementation in the arrangement of FIG. 3, the ad-decisioning server 320 could determine that media clients 300, 302 are likely to be in contention with each other for dynamic replacement of a particular replaceable ad in media stream 310. The ad-decisioning server could make this determination in various ways. For instance, the ad-decisioning server 320 could receive from each media client's DAI system a respective query that uniquely identifies the media client and the replaceable ad instance and asks if the media client should replace the replaceable ad. By referring to the DAI-contention correlation data 322, the ad-decisioning server could then determine that the two media clients that are the subject of these queries are likely to be in DAI contention with each other. The ad-decisioning server 320 could therefore then select just one of the two media clients to replace the replaceable ad. And the ad-decisioning server 320 could then respond to each media client's DAI system accordingly, causing the selected media client to proceed with work to replace the replaceable ad, and causing the other media client to forgo doing so.

As a variation on this process, once the ad-decisioning server 320 receives from one of the media client's DAI systems a query asking if the media client should replace the given replaceable ad, the ad-decisioning server 320 could determine from the DAI-contention correlation data 322 that that media client is likely to be in DAI contention with another media client. And therefore, the ad-decisioning server 320 could wait to also receive from the other media client's DAI system a query asking if the other media client should replace the same replaceable ad, before the ad-decisioning server 320 then responds to both media client's DAI systems. Alternatively, if the ad-decisioning server 320 knows that the media client whose DAI system queries the ad-decisioning server 320 first will be the media client (of the two media clients) that the ad-decisioning serve 320 will select to handle the ad replacement, then the ad-decisioning server 320 may proceed to respond to that media client's DAI system with a directive for the media client to do so, without the ad-decisioning server 320 waiting to receive a query from the other media client's DAI system as well.

As another example, in line with the discussion above, the ad-decisioning server 320 may learn from the correlation data 322 that two media clients are likely to be in DAI contention with each other, and ad-decisioning server 320 may also learn through signaling from one of the media client's DAI system (e.g., signaling from the media client's DAI server) that that media client is currently processing media stream 310 for presentation. Based on scheduling data as to media stream 310, the ad-decisioning server 320 may then further determine that a given replaceable ad is scheduled to be present in media stream 310 at an upcoming time point. The ad-decisioning server may therefore conclude that the two media clients are likely to be in contention specifically for dynamic replacement of that replaceable ad in media stream 310. And therefore, the ad-decisioning server may select one of the media clients to handle the ad replacement and send signals to both media clients' DAI systems to implement that decision.

The ad-decisioning server 320 could also take into consideration various factors as a basis to decide which media client should handle replacement of a given replaceable ad when faced with likely contention.

By way of example, the ad-decisioning server could take into account various business policies, such as the cost to have one media client replace the ad versus the cost to have the other media client replace the ad, among numerous other policies. Based on those policies, the ad-decisioning server 320 may select one media client to replace the ad and may engage in signaling to cause that media client to do so and to cause the other media client to not do so.

As another example, the ad-decisioning server 320 could take into account historical DAI success rate of each media client and favor selection of the media client that has a higher historical DAI success rate. To facilitate this, the ad-decisioning server 320 may have access to such DAI success-rate data on a per media-device basis, possibly compiled by each media device's DAI system based on reports from the media client. For instance, each media client's DAI system may publish or otherwise make that information available to the ad-decisioning server 320. If a media client tends to have a high historical DAI success rate, that could mean that other factors (e.g., business policies) have resulted in selection of that media client to perform dynamic ad replacement in past contention situations, and those other factors may justify selecting that media client again. Whereas, if a media client tends to have a low historical DAI success rate, that could mean that other factors have resulted in decisions in the past to not have that media client perform dynamic ad replacement in contention situations, and those other factors may justify likewise deciding to not select that media client to do so.

Figure 4:
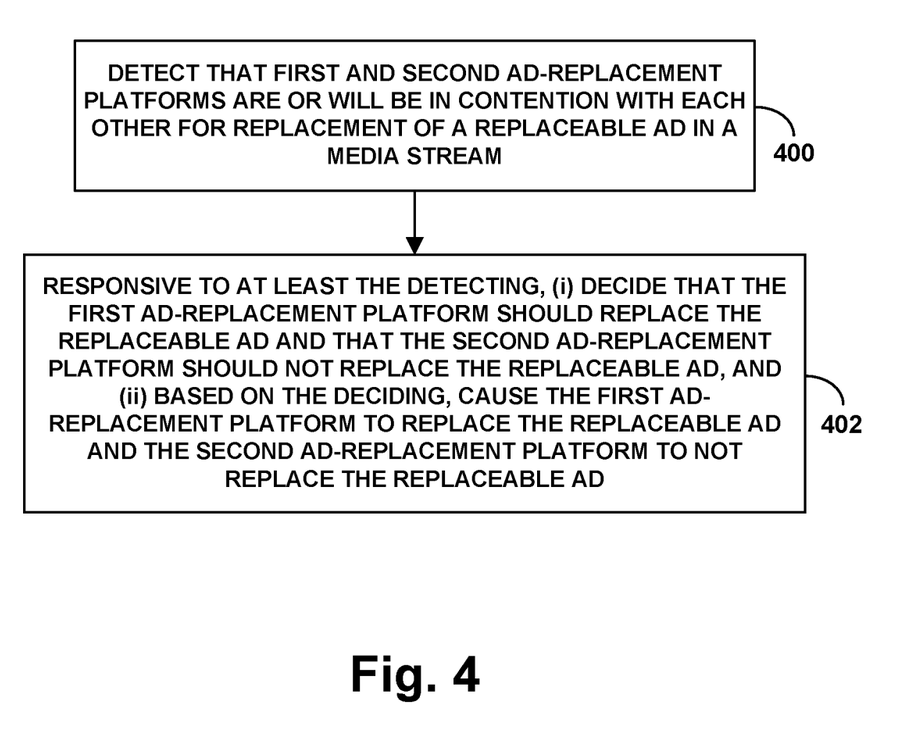
FIG. 4 is a flow chart depicting a method that could be carried out in accordance with the disclosure.

FIG. 4 is next a flow chart depicting a method that could be carried out in accordance with the present disclosure to control dynamic ad replacement. As shown in FIG. 4, at block 400, the method includes a computing system detecting that first and second ad-replacement platforms are or will be in contention with each other for replacement of a replaceable ad in a media stream. And at block 402, the method includes, responsive to at least the detecting, the computing system (i) deciding that the first ad-replacement platform should replace the replaceable ad and that the second ad-replacement platform should not replace the replaceable ad, and (ii) based on the deciding, causing the first ad-replacement platform to replace the replaceable ad and the second ad-replacement platform to not replace the replaceable ad.

In line with the discussion above, the first ad-replacement platform in this method could be at a first media client and the second ad-replacement platform could be at a second media client, and the act of detecting that the first and second ad-replacement platforms are or will be in contention with each other for replacement of the replaceable ad could involve or take the form of detecting that the first and second media clients are or will be in contention with each other for replacement of the replaceable ad. Further, detecting that the first and second media clients are or will be in contention with each other for replacement of the replaceable ad could involve detecting that the first and second media clients are located at the same customer premises as each other and/or detecting that the first and second media clients are in the same media-delivery path as each other.

As further discussed above, one of the first and second ad-replacement platforms in this method could be in a television, and the other of the first and second ad-replacement platforms could be in a device that serves the media stream to the television, such as in a STB, streaming media player, or other device.

Further, as discussed above, the act of detecting that the first and second media clients are or will be in contention for replacement of the replaceable ad could involve referring to correlation data that indicates that the first and second media clients are likely to be in dynamic-ad-replacement contention.

In addition, as discussed above, the act of detecting that the first and second ad-replacement platforms are or will be in contention for replacement of the replaceable ad could involve receiving from at least one of the first and second ad-replacement systems a query to determine whether to replace the replaceable ad and, in response to at least receiving that query, performing the detecting.

Further, the first ad-replacement platform could be part of a first ad-replacement system and the second ad-replacement platform could be part of a second ad-replacement system. And in that context, the act of detecting that the first and second ad-replacement platforms are or will be in contention for replacement of the replaceable ad could involve receiving from at least one of the first and second ad-replacement systems a query to determine whether to replace the replaceable ad and, in response to at least receiving the query, performing the detecting in response to at least receiving the query. Further, the act of causing the second ad-replacement platform to not replace the replaceable ad comprises engaging in control signaling with at least one of the first and second ad-replacement systems.

Still further, as discussed above, the act of detecting that the first and second ad-replacement platforms are or will be in contention for replacement of the replaceable ad could be done without first receiving a query to determine whether one of the first and second ad-replacement platforms should replace the replaceable ad.

In addition, as discussed above, the act of deciding that the first ad-replacement platform should replace the replaceable ad and that the second ad-replacement platform should not replace the replaceable ad could involve deciding which one of the ad-replacement platforms should replace the replaceable ad, with the result of that decision being that the first ad-replacement platform should do so and the second ad-replacement platform should not do so. And as noted above, this deciding could be based on consideration of historical dynamic-ad-replacement success rate of at least one of the first and second ad-replacement platforms.

Further, as discussed above, the act of causing the second ad-replacement platform to not replace the replaceable ad comprises could involve causing the second ad-replacement platform to forgo engaging in preparation for replacement of the replaceable ad, before the first ad-replacement platform replaces the replaceable ad.

Figure 5:
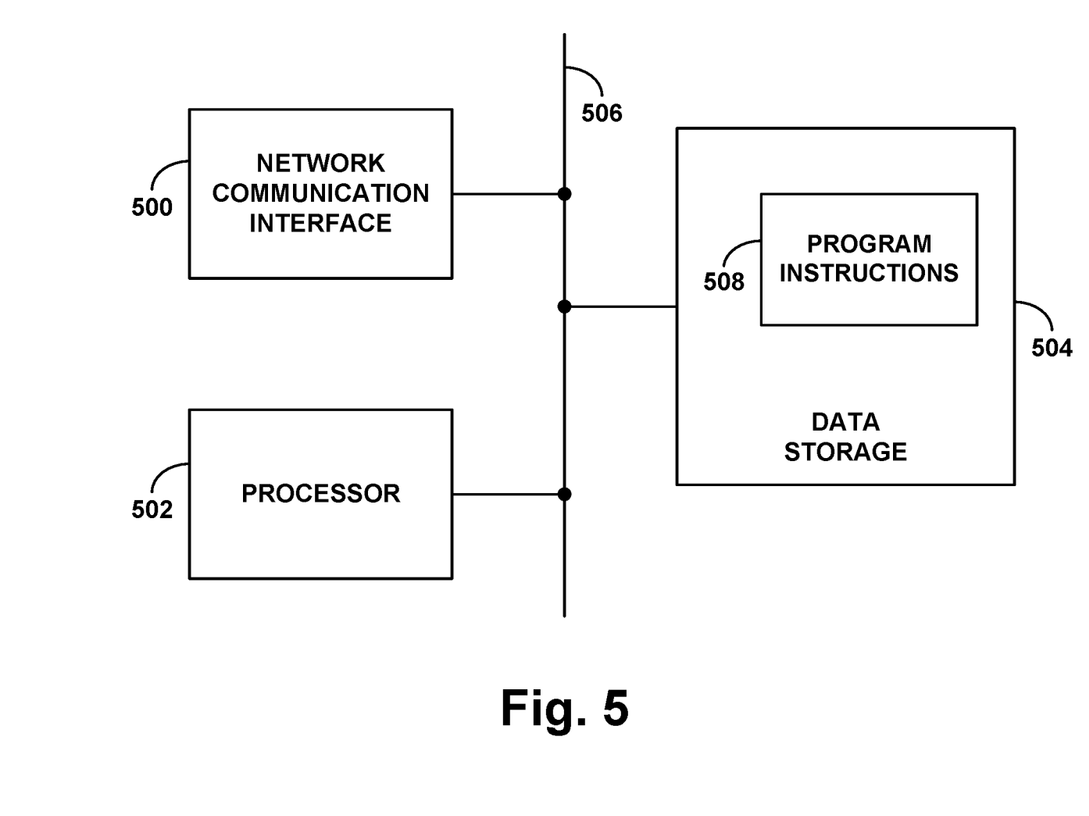
FIG. 5 is a simplified block diagram of an example computing system that could operate in accordance with the disclosure.

FIG. 5 is next a simplified block diagram of an example computing system that could represent any of the various entities discussed above, alone or in combination. As shown in FIG. 5, the example computing system could include at least one network communication interface 500, at least one processor 502, and at least one instance of non-transitory data storage 504, any or all of which could be integrated together in various ways or, as shown, communicatively linked together by one or more system buses, networks, and/or other connection mechanisms 506.

Each network communication interface 500 could comprise one or more network connection mechanisms to facilitate communication on one or more networks, such as one or more LANs and/or one or more WANs, and/or for engaging in direct or networked communication with one or more other local or remote entities. As such, the network communication interface 500 could comprise a wireless or wired Ethernet interface or other type of network interface, for engaging in IP communication and/or other type of network communication, as well as network communication program logic for supporting such communication.

Each processor 502 could comprise one or more general purpose processors (e.g., microprocessors) and/or one or more specialized processors (e.g., application specific integrated circuits). And each instance of non-transitory data storage unit 504 could comprise one or more volatile and/or non-volatile storage components, such as optical, magnetic, or flash storage. As shown, the non-transitory data storage 504 could then store program instructions 508, which could be executable by any of the one or more processors 502 to carry out various operations described herein.

Various other features described herein could be implemented in this context as well, and vice versa.

Figure 6:
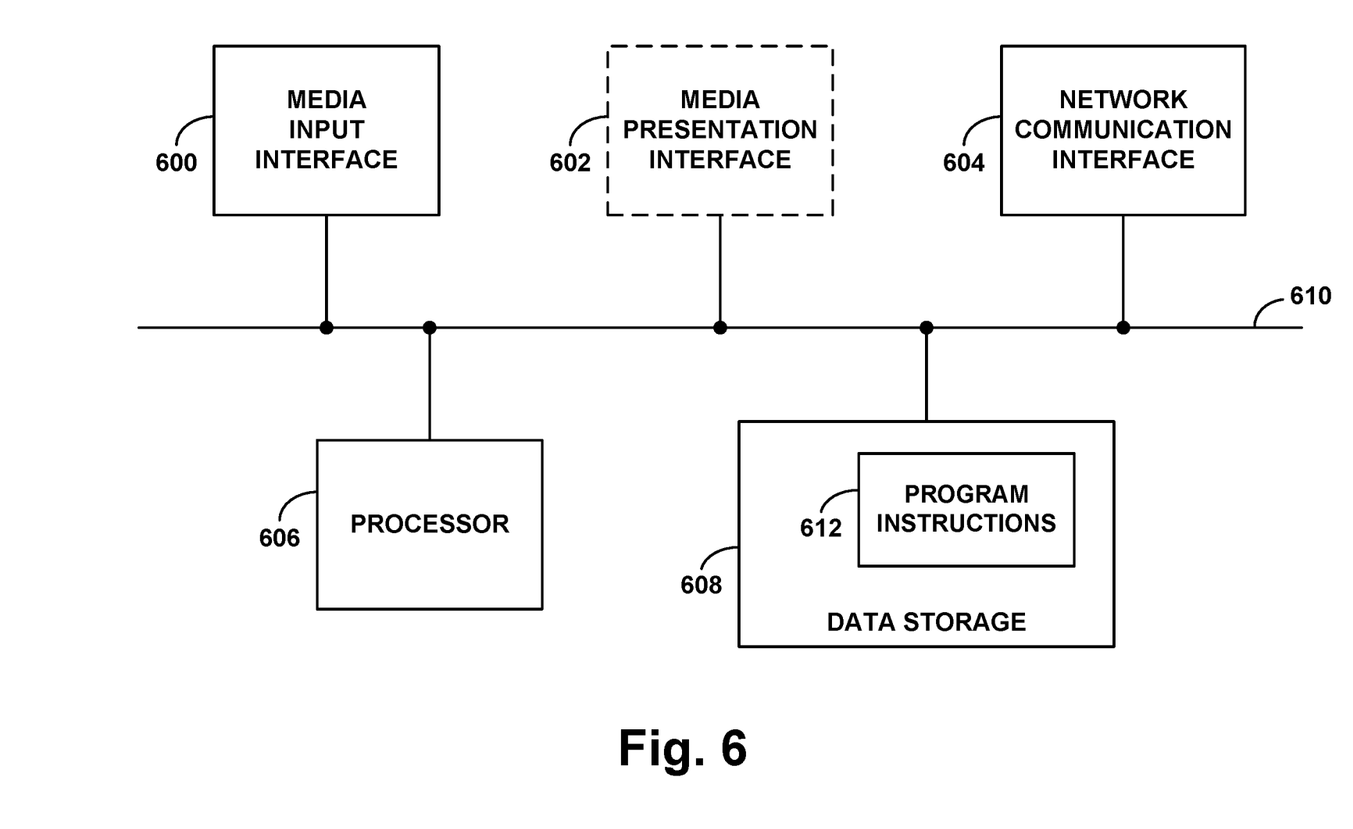
FIG. 6 is a simplified block diagram of an example media client that could operate in accordance with the disclosure.

Finally, FIG. 6 is a simplified block diagram of an example media client. In line with the discussion above, this media client could take various forms noted above, among other possibilities. And as shown in FIG. 6, the example media client includes at least one media input interface 600, optionally at least one media presentation interface 602, at least one network communication interface 604, at least one processor 606, and at least one non-transitory data storage 608, any or all of which could be integrated together or, as shown, communicatively linked together by a system bus, network, or other connection mechanism 610.

The at least one media input interface 600 could comprise a physical communication interface for receiving media content to be processed for presentation. As such, the at least one media input interface could include one or more wired and/or wireless interfaces for establishing communication with and receiving media content in analog or digital form from a receiver or other device or system. For example, a media input interface could include one or more interfaces compliant with protocols such as DVI, HDMI, VGA, USB, BLUETOOTH, WIFI, Ethernet, among numerous other possibilities.

The at least one media presentation interface 602, which could be included if the media client is configured to present media content, could then comprise one or more components to facilitate presentation of the received media content. By way of example, the at least one media presentation interface 602 could comprise a user interface such as a display screen, as well as one or more drivers or other components for processing the received media content to facilitate presentation of the content on the user interface.

The at least one network communication interface 604 could comprise a physical network connection mechanism to facilitate communication on one or more networks, and/or for engaging in direct or networked communication with one or more other local or remote entities. As such, the at least one network communication interface 604 could comprise a wireless or wired Ethernet interface or other type of network interface, for engaging in IP communication and/or other type of network communication.

Further, the at least one processor 606 could comprise one or more general purpose processors (e.g., microprocessors) and/or one or more specialized processors (e.g., application specific integrated circuits). And the at least one non-transitory data storage 608 could comprise one or more volatile and/or non-volatile storage components, such as optical, magnetic, or flash storage. Further, as shown, data storage 608 could store program instructions 612, which could be executable by at least one processor 606 to carry out various operations described herein.

Various other features described above could be implemented in this context as well, and vice versa.

The present disclosure also contemplates a non-transitory computer readable medium that is encoded with, stores, or otherwise embodies program instructions executable by one or more processors to carry out various described operations.

Exemplary embodiments have been described above. Those skilled in the art will understand, however, that changes and modifications may be made to these embodiments without departing from the true scope and spirit of the invention.

What is claimed is:

1. A method for controlling dynamic ad replacement, the method comprising:
   detecting, by a computing system, that a first media client including a first ad-replacement platform is or will be in contention with a second media client including a second ad-replacement platform for replacement of a replaceable ad in a media stream; and
   causing, by the computing system responsive to the detecting, the first ad-replacement platform to replace the replaceable ad in favor of the second ad-replacement platform based at least on consideration of a historical dynamic-ad-replacement success rate of at least one of the first and second ad-replacement platforms, wherein a media presentation device includes one of the first and second ad-replacement platforms, and wherein a device that serves the media stream to the media presentation device includes the other of the first and second ad-replacement platforms.

2. The method of claim 1, wherein the detecting comprises detecting that the first and second media clients are located at a same customer premises as each other.

3. The method of claim 1, wherein the detecting comprises detecting that the first and second media clients are in a same media-delivery path as each other.

4. The method of claim 1, wherein the detecting comprises referring to correlation data that indicates that the first and second media clients are likely to be in dynamic-ad-replacement contention.

5. The method of claim 1, wherein the detecting comprises:
   receiving from at least one of the first and second ad-replacement systems a query to determine whether to replace the replaceable ad; and
   performing the detecting in response to at least receiving the query.

6. The method of claim 1, wherein the first ad-replacement platform is part of a first ad-replacement system and the second ad-replacement platform is part of a second ad-replacement system, and wherein the detecting comprises:
   receiving from at least one of the first and second ad-replacement systems a query to determine whether to replace the replaceable ad; and
   performing the detecting in response to at least receiving the query.

7. The method of claim 1, wherein the detecting is performed without first receiving a query to determine whether one of the first and second ad-replacement platforms should replace the replaceable ad.

8. The method of claim 1, wherein the first ad-replacement platform is part of a first ad-replacement system and the second ad-replacement platform is part of a second ad-replacement system, and wherein the causing the second ad-replacement platform to not replace the replaceable ad comprises engaging in control signaling with at least one of the first and second ad-replacement systems.

9. The method of claim 1, further comprising: causing the second ad-replacement platform to forgo engaging in preparation for replacement of the replaceable ad, before the first ad-replacement platform replaces the replaceable ad.

10. A computing system comprising:
    at least one processor;
    at least one non-transitory data storage; and
    program instructions stored in the at least one non-transitory data storage and executable by the at least one processor to carry out operations for controlling dynamic ad replacement, the operations including:
      detecting that a first media client including a first ad-replacement platform is or will be in contention with a second media client including a second ad-replacement platform for replacement of a replaceable ad in a media stream; and
      causing, responsive to the detecting, the first ad-replacement platform to replace the replaceable ad in favor of the second ad-replacement platform based at least on consideration of a historical dynamic-ad-replacement success rate of at least one of the first and second ad-replacement platforms, wherein a media presentation device includes one of the first and second ad-replacement platforms, and wherein a device that serves the media stream to the media presentation device includes the other of the first and second ad-replacement platforms.

11. The system of claim 10, wherein the operation of the detecting comprises at least one action selected from the group consisting of (i) detecting that the first and second media clients are located at a same customer premises as each other and (ii) detecting that the first and second media clients are in a same media-delivery path as each other.

12. The system of claim 10, wherein the operations further comprise causing the second ad-replacement platform to forgo engaging in preparation for replacement of the replaceable ad, before the first ad-replacement platform replaces the replaceable ad.

13. At least one non-transitory computer-readable medium embodying program instructions executable by at least one processor to carry out operations for controlling dynamic ad replacement, the operations including:
- detecting that a first media client including a first ad-replacement platform is or will be in contention with a second media client including a second ad-replacement platform for replacement of a replaceable ad in a media stream; and
- causing, responsive to the detecting, the first ad-replacement platform to replace the replaceable ad in favor of the second ad-replacement platform based at least on consideration of a historical dynamic-ad-replacement success rate of at least one of the first and second ad-replacement platforms, wherein a media presentation device includes one of the first and second ad-replacement platforms, and wherein a device that serves the media stream to the media presentation device includes the other of the first and second ad-replacement platforms.

14. The at least one non-transitory computer-readable medium of claim 13, wherein the operation of the detecting comprises at least one action selected from the group consisting of (i) detecting that the first and second media clients are located at a same customer premises as each other and (ii) detecting that the first and second media clients are in a same media-delivery path as each other.

15. The at least one non-transitory computer-readable medium of claim 13, wherein the operations further comprise causing the second ad-replacement platform to forgo engaging in preparation for replacement of the replaceable ad, before the first ad-replacement platform replaces the replaceable ad.

* * * * *

UNITED STATES PATENT AND TRADEMARK OFFICE
CERTIFICATE OF CORRECTION

| | | |
|---|---|---|
| PATENT NO. | : 12,034,983 B2 | Page 1 of 1 |
| APPLICATION NO. | : 17/650411 | |
| DATED | : July 9, 2024 | |
| INVENTOR(S) | : Jentz et al. | |

It is certified that error appears in the above-identified patent and that said Letters Patent is hereby corrected as shown below:

In the Specification

In Column 7, Line 4, delete "device 204." and insert -- 204. --, therefor.

In Column 8, Line 13, delete "an" and insert -- a --, therefor.

In Column 8, Line 66, delete "212." and insert -- 214. --, therefor.

In Column 9, Line 38, delete "222" and insert -- 226 --, therefor.

In Column 10, Line 62, delete "204" and insert -- 206 --, therefor.

In Column 13, Line 4, delete "an" and insert -- a --, therefor.

Signed and Sealed this
Sixth Day of May, 2025

Coke Morgan Stewart
*Acting Director of the United States Patent and Trademark Office*